United States Patent
Martin et al.

(10) Patent No.: US 10,343,725 B2
(45) Date of Patent: Jul. 9, 2019

(54) AUTOMOTIVE STRUCTURAL COMPONENT AND METHOD OF MANUFACTURE

(71) Applicant: GM Global Technology Operations LLC, Detroit, MI (US)

(72) Inventors: Justin C. Martin, Ferndale, MI (US); Joseph M. Polewarczyk, Rochester Hills, MI (US); Paul J. Wolcott, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 22 days.

(21) Appl. No.: 15/448,948

(22) Filed: Mar. 3, 2017

(65) Prior Publication Data

US 2018/0251163 A1 Sep. 6, 2018

(51) Int. Cl.
| | |
|---|---|
| *B62D 29/00* | (2006.01) |
| *B60R 19/26* | (2006.01) |
| *B33Y 10/00* | (2015.01) |
| *B33Y 80/00* | (2015.01) |
| *B22F 3/105* | (2006.01) |
| *B62D 21/02* | (2006.01) |
| *B62D 21/15* | (2006.01) |
| *B62D 29/04* | (2006.01) |
| *B29C 64/153* | (2017.01) |
| *B29L 31/30* | (2006.01) |

(52) U.S. Cl.
CPC ........ *B62D 29/007* (2013.01); *B22F 3/1055* (2013.01); *B29C 64/153* (2017.08); *B33Y 10/00* (2014.12); *B33Y 80/00* (2014.12); *B60R 19/26* (2013.01); *B62D 21/02* (2013.01); *B62D 21/152* (2013.01); *B62D 29/008* (2013.01); *B62D 29/041* (2013.01); *B29L 2031/30* (2013.01)

(58) Field of Classification Search
CPC ....... B22F 3/1055; B60R 19/24; B60R 19/26; B62D 21/15; B62D 21/152; B62D 29/007; B62D 29/008
USPC ......... 293/132, 133; 296/30, 187.09, 187.11, 296/193.09, 203.02
See application file for complete search history.

(56) References Cited

U.S. PATENT DOCUMENTS

| | | | | |
|---|---|---|---|---|
| 6,017,084 A * | 1/2000 | Carroll, III | .......... | B60N 2/4249 280/751 |
| 2002/0043809 A1* | 4/2002 | Vismara | .................. | B60R 19/18 293/133 |
| 2011/0193371 A1* | 8/2011 | Klimek | .................... | B60R 19/34 296/187.09 |
| 2015/0158442 A1* | 6/2015 | Yun | ......................... | B60R 19/34 293/132 |
| 2017/0028950 A1* | 2/2017 | Keller | ..................... | B60R 19/00 |
| 2017/0057558 A1* | 3/2017 | Hillebrecht | ............ | B62D 21/02 |

(Continued)

FOREIGN PATENT DOCUMENTS

DE 19851496 A1 * 5/2000 ............. B60R 19/20

OTHER PUBLICATIONS

English translation of DE19851496; retreived Jul. 11, 2018 via PatentTranslate located at www.epo.org. (Year: 2018).*

*Primary Examiner* — Jason S Daniels

(57) ABSTRACT

An automotive structural component includes a lattice structure. The lattice structure defines a plurality of cells. The plurality of cells include a multitude of at least partially filled cells each at least partially filled with a filling, and a multitude of hollow cells distributed amongst the multitude of at least partially filled cells to distribute and direct load.

15 Claims, 3 Drawing Sheets

(56) References Cited

U.S. PATENT DOCUMENTS

2017/0217393 A1* 8/2017 Mohapatra .............. B60R 19/34
2017/0327066 A1* 11/2017 Lakic ...................... B60R 19/34

* cited by examiner

AUTOMOTIVE STRUCTURAL COMPONENT AND METHOD OF MANUFACTURE

INTRODUCTION

The subject invention relates to automotive structural components, and more particularly, to additive manufactured, automotive, structural components and a method of manufacture.

Automotive structural components are used to support various elements of a vehicle including powertrains, fuel tanks, suspensions, chassis bodies, cabins, and other elements. Such components may be designed to dynamically withstand various forces attributable by the movement of the vehicle over various terrains and, in some instances, provide a degree of protection for the operator of the vehicle. Often, the greater the degree of structural support, the greater the weight. Moreover, the designed orientation and configuration of various structural components may be limited by available manufacturing techniques. Accordingly, it is desirable to provide further enhancements and design options associated with the manufacture of automotive structural components.

SUMMARY

In one exemplary, non-limiting, embodiment of the invention, an automotive structural component includes a lattice structure. The lattice structure defines a plurality of cells. The plurality of cells include a multitude of at least partially filled cells each at least partially filled with a filling, and a multitude of hollow cells distributed amongst the multitude of at least partially filled cells to distribute and direct load.

Additionally to the forgoing embodiment, the multitude of hollow cells are open cells.

In the alternative or additionally thereto, in the foregoing embodiment, the lattice structure and the filling are additive layer manufactured.

In the alternative or additionally thereto, in the foregoing embodiment, at least the lattice structure is additive manufactured.

In the alternative or additionally thereto, in the foregoing embodiment, the lattice structure is metallic.

In the alternative or additionally thereto, in the foregoing embodiment, the lattice structure and the filling are one homogeneous piece.

In the alternative or additionally thereto, in the foregoing embodiment, the plurality of cells are the same size.

In the alternative or additionally thereto, in the foregoing embodiment, the automotive structural component includes an additive manufactured outer skin surrounding the lattice structure.

In the alternative or additionally thereto, in the foregoing embodiment, the lattice structure, the fillings, and the outer skin are one unitary piece.

In the alternative or additionally thereto, in the foregoing embodiment, the multitude of at least partially filled cells form at least one first row and the multitude of hollow cells from at least one second row disposed adjacent to the at least one first row.

In the alternative or additionally thereto, in the foregoing embodiment, the at least one first row is a V-shape.

In the alternative or additionally thereto, in the foregoing embodiment, the at least one second row is a V-shape.

In the alternative or additionally thereto, in the foregoing embodiment, the lattice structure includes a plurality of stacked slices each including the plurality of cells.

In another, non-limiting, embodiment of the present invention, a vehicle frame includes a first component, a second component, and an additive manufactured component. The additive manufactured component extends between and is engaged to the first and second components. The additive manufactured component includes a lattice structure defining a plurality of cells. The plurality of cells include a multitude of at least partially filled cells, and a multitude of hollow cells distributed amongst the multitude of at least partially filled cells to distribute and direct load.

Additionally to the foregoing embodiment, the first component includes a frontal impact barrier.

In the alternative or additionally thereto, in the foregoing embodiment, the second component includes a frame rail.

In another, non-limiting, embodiment of the invention, a method of forming an automotive structural component includes the step of additive manufacturing a lattice structure. The lattice structure defines a plurality of cells having a multitude of at least partially filled cells, and a multitude of hollow cells. The multitude of hollow cells are distributed amongst the multitude of at least partially filled cells to distribute and direct load.

Additionally to the foregoing embodiment, the method includes additive manufacturing a filling disposed in each one of the multitude of at least partially filled cells when additive manufacturing the lattice structure.

In the alternative or additionally thereto, in the foregoing embodiment, the additive manufacturing is additive layer manufacturing.

In the alternative or additionally thereto, in the foregoing embodiment, the method includes emptying an unused powder from the multitude of hollow cells that are open cells.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
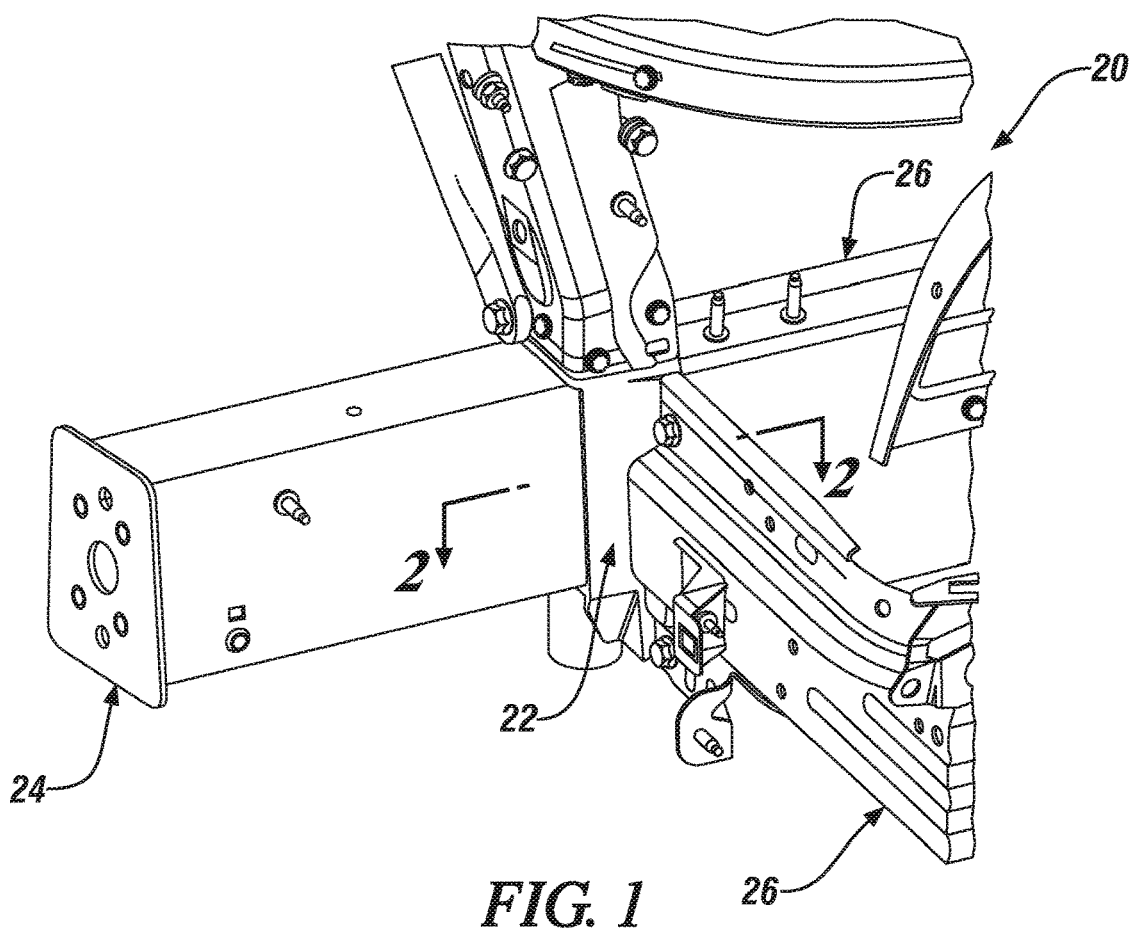
FIG. 1 is a partial perspective view of a vehicle frame as one, non-limiting, exemplary embodiment of the present invention.

The following description is merely exemplary in nature and is not intended to limit the present disclosure, its application, or uses. It should be understood that throughout the drawings, corresponding reference numerals indicate like or corresponding parts and features.

In accordance with an exemplary embodiment of the present disclosure, FIG. 1 illustrates a portion of, for example, a vehicle frame 20 that may include three components 22, 24, 26. Component 22 may extend between, and may be engaged to, the components 24, 26. In one embodiment, the component 22 may be an automotive structural component; the component 26 may be a sub-frame, a frame attachment, or other structural component; and, the component 24 may be a barrier (e.g., frontal impact barrier), a sub-frame, a frame attachment, or other structural component. In one example, the structural component 22 may extend between, and is engaged to, the frontal impact barrier 24 and the frame attachment 26.

In one embodiment, the component or frame attachment 26 may be a cross rail, a longitudinal rail, and/or a rocker panel. The component or frontal impact barrier 24 may be a front bumper or a front bumper support, and the automotive structural component 22 may be a juncture between components 24, 26. The components 24, 26 may be made of any type of structural material including plastic, aluminum, steel, and other metal alloys. Moreover, the components 24, 26 may be manufactured by traditional means (i.e., other than additive manufacturing) and may be molded, machined, and/or stamped. The automotive structural component 22 may be additive manufactured from any variety of materials sufficient to achieve the structural integrity needed. In one embodiment, the automotive structural component 22 may be additive manufactured directly to one, or both, of the components 24, 26. In another embodiment, the automotive structural component 22 may be additive manufactured separate from the components 24, 26, and later engaged to the components 24, 26 by any variety of ways including fasteners, welding, adhesion, and others.

Figure 2:
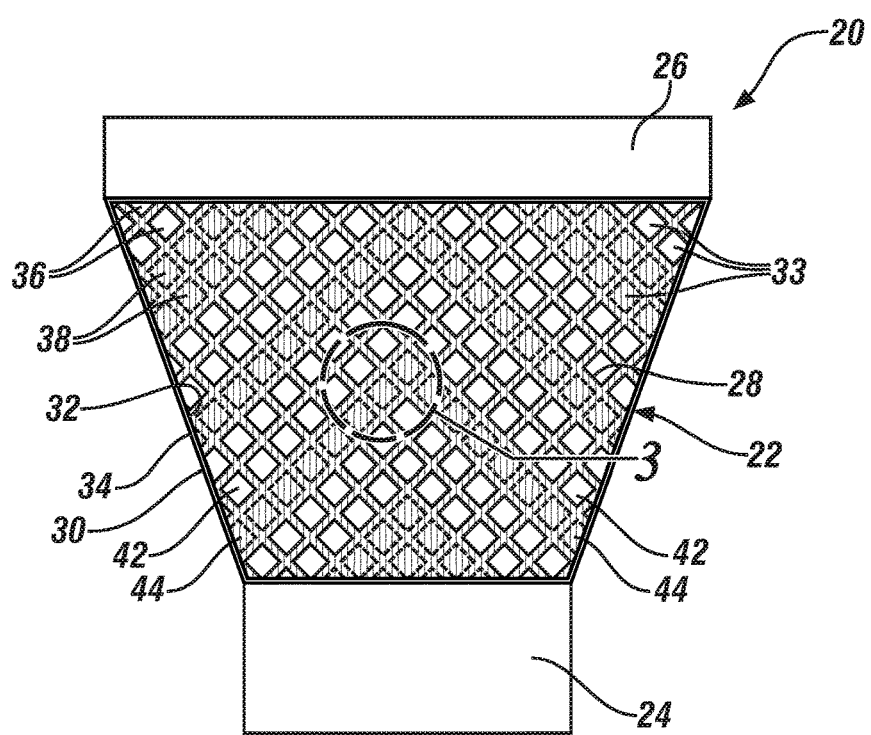
FIG. 2 is a cross section of the vehicle frame illustrating an automotive structural component and taken along line 2-2 of FIG. 1.

Referring to FIG. 2, the automotive structural component 22 may include a lattice structure 28 and an outer skin or encasement 30. The lattice structure 28 may be generally located inside the encasement 30. In one embodiment, the lattice structure 28 may extend between and is engaged to an inner surface 32 of the encasement 30, and an outer surface 34 of the encasement 30 may be in direct contact with the components 24, 26. The lattice structure 28 may be made of the same material and may be formed as one unitary, homogeneous, piece with the encasement 30. In another embodiment, the encasement 30 may be formed or manufactured separate from the lattice structure 28 that is later inserted inside the encasement 30.

Figure 3:
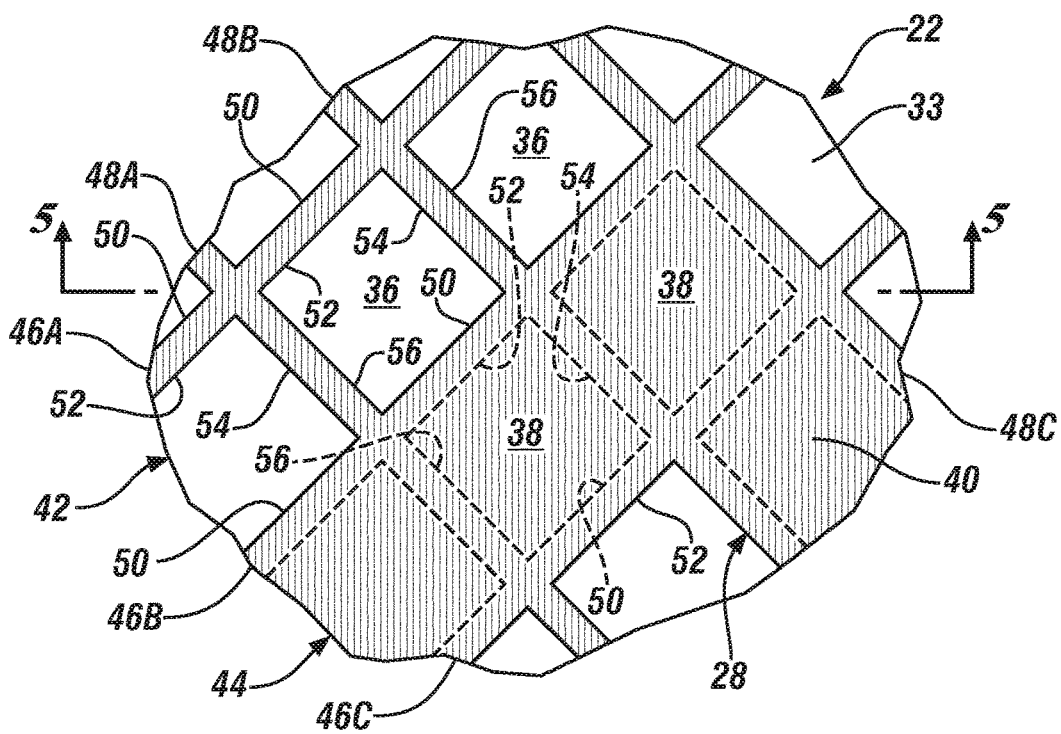
FIG. 3 is a partial cross section of a lattice structure of the automotive structural component taken from circle 3 of FIG. 2.

Referring to FIGS. 2 and 3, the lattice structure 28 of the automotive structural component 22 may define the boundaries of a plurality of cells 33. Each cell 33 may generally be the same shape and may have a repeating orientation or configuration. The plurality of cells 33 may include a multitude of hollow cells 36 and a multitude of at least partially filled cells 38. In one example, each of the at least partially filled cells 38 may be filled with a filling 40. In another example, a segment of the lattice structure 28 may include walls that generally surround and define a respective cell 38, and the cell 38 may contain material that lines the surrounding walls effectively increasing the wall thickness of the segment of the lattice structure 28. The material lining the walls may be made of the same material as the lattice structure 28.

In one embodiment, the lattice structure 28 and the filling 40 (or walls with an increased wall thickness) may be made, or formed, as one unitary and homogeneous piece via additive manufacturing. Alternatively, the filling 40 may be made of a different material than the lattice structure 28, and/or, may be in loose powder form, liquid form, or solid form that may be engaged or formed directly to the surrounding lattice structure 28. Although each cell 33 is illustrated as being diamond shaped and defined by four sides of the lattice structure 28, it is understood that each cell 33 may be any shape. For example, the repeating cells 33 may be triangular, square, hexagonal, or any other shape.

The hollow and at least partially filled cells 36, 38 may be arranged in specific patterns to distribute and/or redirect forces exerted upon the component 22. For example, the hollow and at least partially filled cells 36, 38 may respectfully form interchanging rows 42, 44 that may be V-shaped, see FIG. 2. The arrangement of hollow and at least partially filled cells 36, 38 may further facilitate and/or control plastic deformation (i.e., predefined crush paths) of the component 22, and/or adjacent components 24, 26, in a general, predefined, direction that may be different than the direction of the exerted force. It is contemplated and understood that the plurality of cells 33 may be open cells or closed cells, and may be dependent upon the type of additive manufacturing process applied. It is further contemplated that the lattice structure 28 may include stacked slice segments or layers of cells 33. In such a three-dimensional orientation, the V-shape of one layer of at least partially filled cells 38 may, for example, generally form a three-dimensional cone shape, or any other shape.

Referring to FIG. 3 and in one embodiment, the lattice structure 28 may include a plurality of first walls (i.e., three illustrated as 46A, 46B, 46C) that may be elongated, and a plurality of second intersecting walls (i.e., three illustrated as 48A, 48B, 48C). The first walls 46A, 46B, 46C may be substantially parallel to one-another, and the second intersecting walls 48A, 48B, 48C may be substantially parallel to one another with each wall 48A, 48B, 48C intersecting the plurality of first walls 46A, 46B, 46C. The first walls 46A, 46B, 46C may each include opposite faces 50, 52, and the intersecting walls 48A, 48B, 48C may each include opposite faces 54, 56. In one embodiment, a hollow cell 36 of the plurality of cells 33 may be defined by opposing faces 52, 50 of respective, adjacent, walls 46A, 46B, and opposing faces 56, 54 of respective, adjacent, intersecting walls 48A, 48B. The hollow cell 36 may be generally surrounded by four adjacent cells 33 (i.e., hollow and/or at least partially filled cells 36, 38) separated by one of the walls. For example, a filled cell 38 of the plurality of cells 33 may be adjacent to the hollow cell 36 and is separated from the hollow cell 36 by wall 46B. The filled cell 38 of the plurality of cells 33 may be defined by opposing faces 52, 50 of respective, adjacent, walls 46B, 46C, and opposing faces 56, 54 of respective, adjacent, intersecting walls 48A, 48B.

Figure 4:
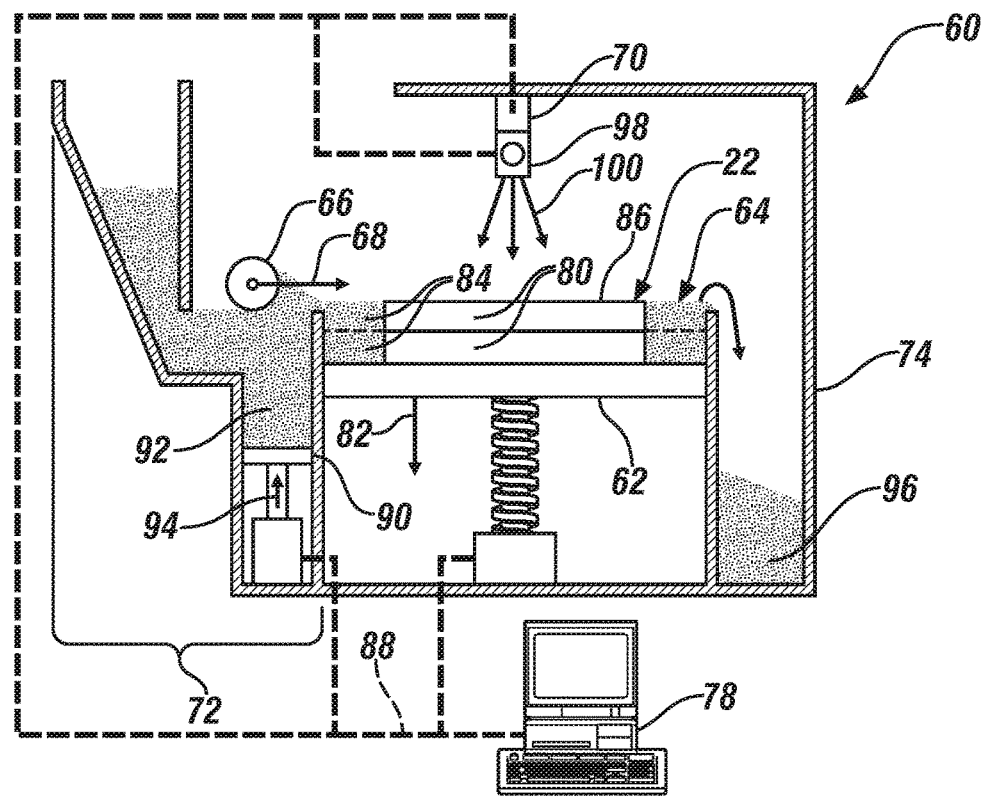
FIG. 4 is a schematic of an additive manufacturing system used to manufacture at least the lattice structure of the automotive structural component of the vehicle frame.

Referring to FIG. 4, the automotive structural component 22 may be formed as a manufacturing product, or workpiece, in an additive manufacturing system 60. The additive manufacturing system 60 may be an Additive Layer Manufacturing (ALM) device (i.e., powder bed fusion). Examples of ALM device types may include Direct Metal Laser Sintering (DMLS), Selective Laser Melting (SLM), Laser Beam Melting (LBM), Electron Beam Melting (EBM), and others. ALM devices may facilitate the fabrication of complex metal, polymer, ceramic and composite structures by freeform, layer-by-layer construction of the workpiece. As is generally known by one skilled in the art of additive manufacturing, the principles behind additive manufacturing processes involves the selective melting of atomized precursor powder beds by a directed energy source that may produce the lithographic build-up of the workpiece. The melting of the powder may occur in small localized regions of the energy beam, producing small volumes of melting, called melt pools, typically followed by rapid solidification, allowing for very precise control of the solidification process in the layer-by-layer fabrication of the workpiece. The ALM devices may be directed by three-dimensional geometry, solid, models developed in Computer Aided Design (CAD) software systems. It is further contemplated and understood that other additive manufacturing processes may be applied to form the automotive structural component 22. Examples of other processes may include VAT Photopolymerisation, Material Jetting, Binder Jetting, Material Extrusion (i.e., fuse deposition modelling), Sheet Lamination using ultrasonic welding, Directed Energy Deposition, and others.

In one embodiment, the ALM device or system 60, as one example of an additive manufacture system capable of manufacturing the automotive structural component 22, is schematically illustrated in FIG. 4. The ALM device 60 may include a build table 62 for holding a powder bed 64, a particle spreader or wiper 66 for spreading the powder bed 64 over the build table 62 (see arrow 68), an energy gun 70 for selectively melting regions of successive layers 84 of the powder bed 64, a powder supply hopper 72 for supplying powder to the spreader 66, and a powder surplus hopper 74. The ALM device 60 may be constructed to build the automotive structural component 22, or any portions thereof, in a layer-by-layer fashion. The powder bed 64 may be composed of the same material composition as the component or workpiece being additively manufactured.

Figure 5:
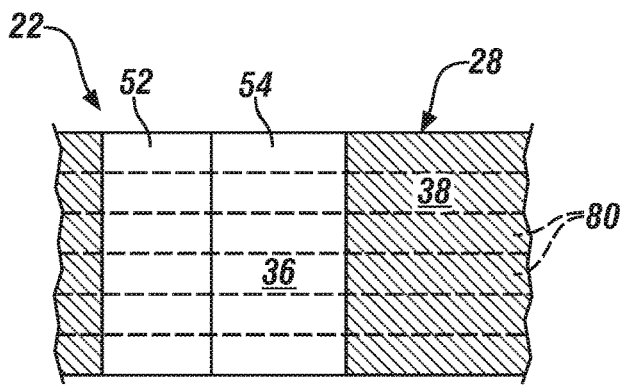
FIG. 5 is a cross section of the lattice structure of the automotive structural component taken along line 5-5 of FIG. 3.

Referring to FIGS. 4 and 5, the ALM device 60 may include a controller or computer 78, which contains software for entering data and programming automated functions in accordance with an inputted, three-dimensional, computer aided design (CAD) model of the automotive structural component 22. The model may include a breakdown of the component 22 into a plurality of slices 80 additively built atop one-another generally in a vertical, or Z-coordinate, direction (see arrow 82 in FIG. 4). Each solidified slice 80 corresponds to a layer 84 of the powder bed 64 prior to solidification, and each layer 84 is placed on top of a build surface 86 of the previously solidified slice 80.

The controller 78 may generally operate the entire ALM device 60 through a series of electrical and/or digital signals 88 sent to the various device elements. For example, the controller 78 may send a signal 88 to a mechanical piston 90 of the supply hopper 72 to push a supply powder 92 upward (see arrow 94) for receipt by the spreader 66. The spreader 66 may be a wiper, roller, or other device that pushes (see arrow 68), or otherwise places, the supply powder 92 over the build surface 86 of the workpiece by a pre-determined thickness established through downward movement (see arrow 82) of the build table 62 controlled by the controller 78. Any excess powder 96 may be pushed into the surplus hopper 74 by the spreader 66.

Once a substantially level powder layer 84 is established over the build surface 86, the controller 78 may send a signal 88 to the energy gun 70 to emit a laser or electron beam (see arrows 100). The electron beam 100 may be steered or directed by a directional mechanism 98 that may be generally located at the output of the energy gun 70. The directional mechanism 98 may include a focusing lens that focuses the beam 100 emitted from the energy gun 70. An electromagnetic scanner or rotating mirror of the mechanism 98 may then controllably direct the energy beam 100.

The controlled energy beam 100 impinges upon selected regions of the top layer 84 of the powder bed 64. The beam 100 may move along the layer 84 melting region-by-region of the layer at a controlled rate and power, thereby melting each region into pools. The pools may then solidify and ultimately form the slice 80. The process may then repeat itself where another powder layer 84 is spread over the last solidified slice 80, and the energy gun 70 melts at least a portion of that layer along with a melt-back region of the previously solidified slice 80 to form the automotive structural component 22.

As previously stated, the plurality of hollow cells 36 of the lattice structure 28 may be open cells. Because the cells 36 are open, the unused, or un-melted, powder remaining in the cells during various stages of ALM, or after manufacturing, may be emptied from each hollow cell.

Figure 6:
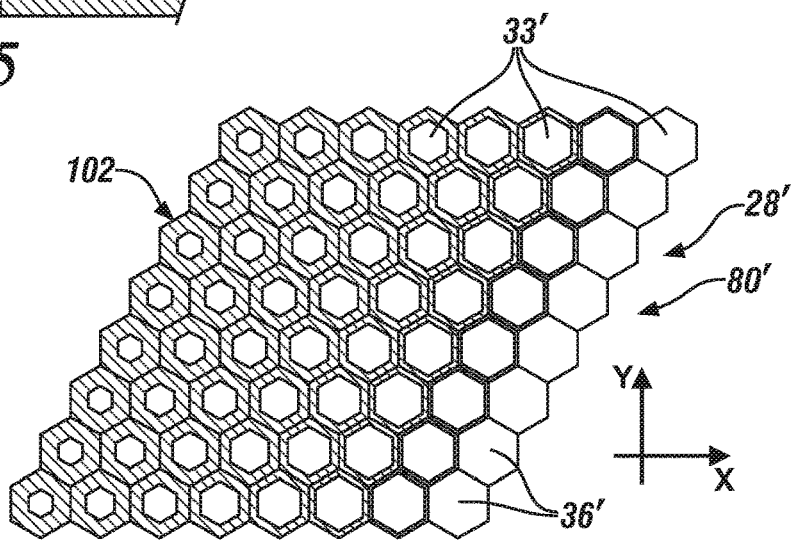
FIG. 6 is a plan view of a top slice section of a second embodiment of a lattice structure.
Figure 7:
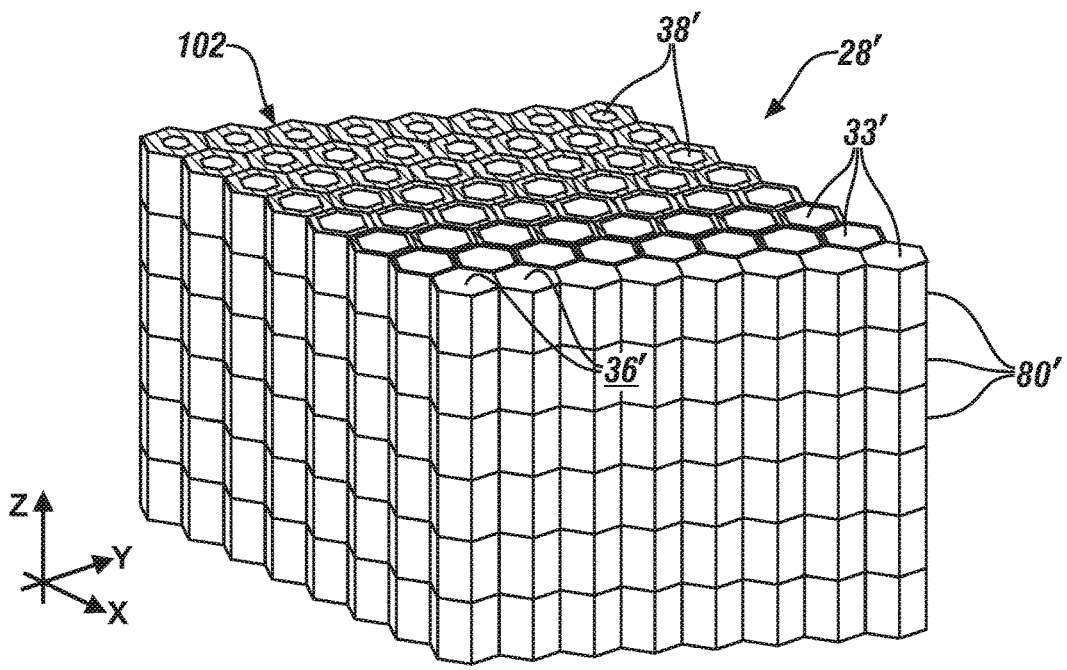
FIG. 7 is a perspective view of the lattice structure of FIG. 6 illustrating a plurality of slice sections.

Referring to FIGS. 6 and 7, a second embodiment of a structural component is illustrated wherein like elements to the first embodiment have like identifying numerals except with the addition of a prime symbol suffix. A lattice structure 28' may be additive manufactured with a plurality of slices 80' (i.e. slice or layered sections) stacked on top one-another as one homogeneous piece. As illustrated, each slice 80' of the lattice structure 28' may generally lie along an x-y coordinate plane, and may be stacked in a z-coordinate direction. Each slice 80' may include a plurality of cells 33' that may generally be, as one example, hexagonal in shape. Each plurality of cells 33' defined by each slice 80' may include a plurality of hollow cells 36' and a plurality of at least partially filled cells 38'. The cells 36', 38' in each slice 80' may form a density pattern 102. The density pattern 102 in one slice 80' may differ from the density pattern in an adjacent slice. The density patterns 102 taken together amongst the plurality of slices may form a three dimensional density pattern.

In the present example, FIGS. 6 and 7 depict partially filled cells 38' as cells containing a layer of material adhered, or homogeneously formed into, the adjacent, defining, walls of the lattice structure 28' that define the cell 38'. It is further contemplated and understood that each cell 38' may be filled with a material that is different than the material of the lattice structure 28'. Alternatively, each cell 38' may be completely filled with the same material as that of the lattice structure 28', but may further have a uniform density that is different than the lattice structure density.

Advantages and benefits of the present disclosure include a multicellular automotive structural component capable of defining, tunable, crush paths in the event of an impact load, externally applied force, and/or service loads. Another advantage is the ability to design and realize complex cellular structures utilizing an additive manufacturing process.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An automotive structural component comprising:
   a lattice structure defining a plurality of cells having a multitude of at least partially filled cells each at least partially filled with a filling, and a multitude of hollow cells distributed amongst the multitude of at least partially filled cells to distribute and direct load, wherein the multitude of at least partially filled cells form at least one first row and the multitude of hollow cells form at least one second row disposed adjacent to the at least one first row, and wherein the at least one first row is a V-shape.

2. The automotive structural component set forth in claim 1, wherein the multitude of hollow cells are open cells.

3. The automotive structural component set forth in claim 2, wherein the lattice structure and the filling are additive layer manufactured.

4. The automotive structural component set forth in claim 3 further comprising:
an additive manufactured outer skin surrounding the lattice structure.

5. The automotive structural component set forth in claim 4, wherein the lattice structure, the fillings, and the outer skin are one unitary piece.

6. The automotive structural component set forth in claim 1, wherein at least the lattice structure is additive manufactured.

7. The automotive structural component set forth in claim 6, wherein the lattice structure is metallic.

8. The automotive structural component set forth in claim 7, wherein the lattice structure and the filling are one homogeneous piece.

9. The automotive structural component set forth in claim 6, wherein the lattice structure includes a plurality of stacked slices each including the plurality of cells.

10. The automotive structural component set forth in claim 1, wherein the plurality of cells are the same size.

11. The automotive structural component set forth in claim 1, wherein the at least one second row is a V-shape.

12. A method of forming an automotive structural component comprising:
additive manufacturing a lattice structure defining a plurality of cells having a multitude of at least partially filled cells, and a multitude of hollow cells distributed amongst the multitude of at least partially filled cells to distribute and direct load, wherein the multitude of at least partially filled cells form at least one first row and the multitude of hollow cells form at least one second row disposed adjacent to the at least one first row, and wherein the at least one first row is a V-shape.

13. The method set forth in claim 12 further comprising:
additive manufacturing a filling disposed in each one of the multitude of at least partially filled cells when additive manufacturing the lattice structure.

14. The method set forth in claim 13, wherein the additive manufacturing is additive layer manufacturing.

15. The method set forth in claim 14 further comprising: emptying an unused powder from the multitude of hollow cells, wherein the multitude of hollow cells are open cells.

* * * * *